UNITED STATES PATENT OFFICE.

DAVID WESSON, OF MONTCLAIR, NEW JERSEY, ASSIGNOR TO THE SOUTHERN COTTON OIL COMPANY, OF NEW YORK, N. Y., A CORPORATION OF NEW JERSEY.

MANUFACTURE OF CATALYZERS.

1,143,339.

Specification of Letters Patent.

Patented June 15, 1915.

No Drawing.

Application filed July 6, 1912. Serial No. 708,069.

*To all whom it may concern:*

Be it known that I, DAVID WESSON, a citizen of the United States, residing in Montclair, in the county of Essex, in the State of New Jersey, have invented certain new and useful Improvements in the Manufacture of Catalyzers, of which the following is the specification.

As is well known, finely divided metals exercising catalytic action are employed for bringing about chemical reactions, as, for instance, for causing hydrogen to be absorbed by unsaturated fats. In many uses to which catalyzers are thus put, it is desirable that the finely divided metal constituting the catalyzer shall be carried by an inert or indifferent support, such as asbestos, glass wool, slag wool, pumice stone, infusorial earth, clay, etc. The purpose of this is to afford an extended surface for the catalyzer at which the catalytic action may take place.

My invention relates to a method of forming the catalyzer and applying it to this support and has the advantage that the catalytic metal is applied to the surface only of the support, and has other advantages which will appear from the description of my process, which I prefer to carry out as follows, though the details of the steps may be varied without departing from the spirit of my invention.

I first dissolve nitrate of nickel in water and then add hydrate of ammonium, which causes hydrate of nickel to be precipitated in the form of a voluminous, flocculent precipitate. Care should be taken to add only a sufficient quantity of hydrate of ammonium to form the precipitate, as an excess will break down the hydrate of nickel and cause it to re-dissolve. In thus using ammonium as a precipitant, any sulfates or chlorids which may be present in the nitrate of nickel may be converted into sulfates or chlorids of ammonium which are volatilized at the temperature at which the nickel is subsequently reduced; this serves as a method of purification, which is very desirable in order to produce an active catalyzer. After the precipitate of hydrate of nickel is formed, the supernatant liquid containing nitrate of ammonium and some unprecipitated nickel salts may be decanted off, leaving hydrate of nickel and water with a small amount of ammonium salts dissolved in the water. This flocculent precipitate is then mixed with the inert carrier to which it is to be applied, as, for instance, asbestos. The precipitate and the support are then dried to expel the water, and are heated at a temperature of say 500° C. in a current of hydrogen until the nickel has been reduced to a finely divided condition covering the asbestos fibers or other support used. The nitrate of ammonium that remained in the water assists in this; as the support covered by the flocculent precipitate is heated, the nitrate of ammonium is decomposed, leaving most of the nickel hydrate around it in a very fine and spongy condition, in which it is more easily reduced by the hydrogen, and at the same time puts it in such shape that it presents a greater surface for contact action.

There are substantial advantages in applying the flocculent hydrate of nickel to the support, as described above, instead of applying to the support a solution of a salt and afterward adding a precipitant. For in my method, the hydrate acts only on the surface of the support (which is the place where it is wanted) and is not soaked up into the internal pores of the support, as it would be if the support were treated with a solution of a salt and precipitation were brought about afterward.

I claim as my invention:

1. A method of preparing a catalyzer which consists in treating a solution of a nickel salt with ammonium hydrate, applying such precipitate to an inert carrier and reducing the same in hydrogen and in the presence of heat.

2. The process of producing a catalyzer which consists in treating a solution of soluble nickel compound with an ammonium compound which will form a nickel precipitate and volatilizable compounds in the solution, applying the precipitate to an inert carrier, heating the mass to drive off the volatilizable compounds and reducing the nickel with hydrogen in the presence of heat.

DAVID WESSON.

Witnesses:
EDWARD E. COLES,
FRED'K. L. PALMER.